United States Patent

[11] 3,626,378

[72] Inventors Adelin Eugene Gaston Salle
Versailles, France;
Alois Rene Termote, Edegem, Belgium;
Stanislas Kobus, Palaiseau, France

[21] Appl. No. 758,733
[22] Filed Sept. 10, 1968
[45] Patented Dec. 7, 1971
[73] Assignee International Standard Electric Corporation
New York, N.Y.
[32] Priority Sept. 22, 1967
[33] Belgium
[31] 704177

[54] ADDRESSING ARRANGEMENT
5 Claims, 2 Drawing Figs.

[52] U.S. Cl. .......... 340/172.5, 179/18 HA
[51] Int. Cl. .......... G06f 9/20
[50] Field of Search .......... 179/18 TR, 18.81, 18; 340/172.5; 235/157, 92

[56] References Cited

UNITED STATES PATENTS

| | | | |
|---|---|---|---|
| 3,258,749 | 6/1966 | Jenkins .......... | 235/92 |
| 3,366,927 | 1/1968 | Falkoff .......... | 340/172.5 |
| 3,221,107 | 11/1965 | Seemann et al. .......... | 179/18.81 |
| 3,462,743 | 8/1969 | Milewski .......... | 340/172.5 |
| 3,560,661 | 2/1971 | Kobus et al. .......... | 179/18 |

*Primary Examiner*—Raulfe B. Zache
*Assistant Examiner*—Mark Edward Nusbaum
*Attorneys*—C. Cornell Remsen, Jr., Rayson P. Morris, Percy P. Lantzy, J. Warren Whitesel and Delbert P. Warner

ABSTRACT: An addressing arrangement for accessing a memory storage location, and for accessing successive other locations if the first location returns a predetermined signal. A random number generator is used to provide the changes in the accessing location code. A specific application for which the arrangement is intended is to provide PBX hunting for an available line with a PBX group.

ADDRESSING ARRANGEMENT

Figure 1:
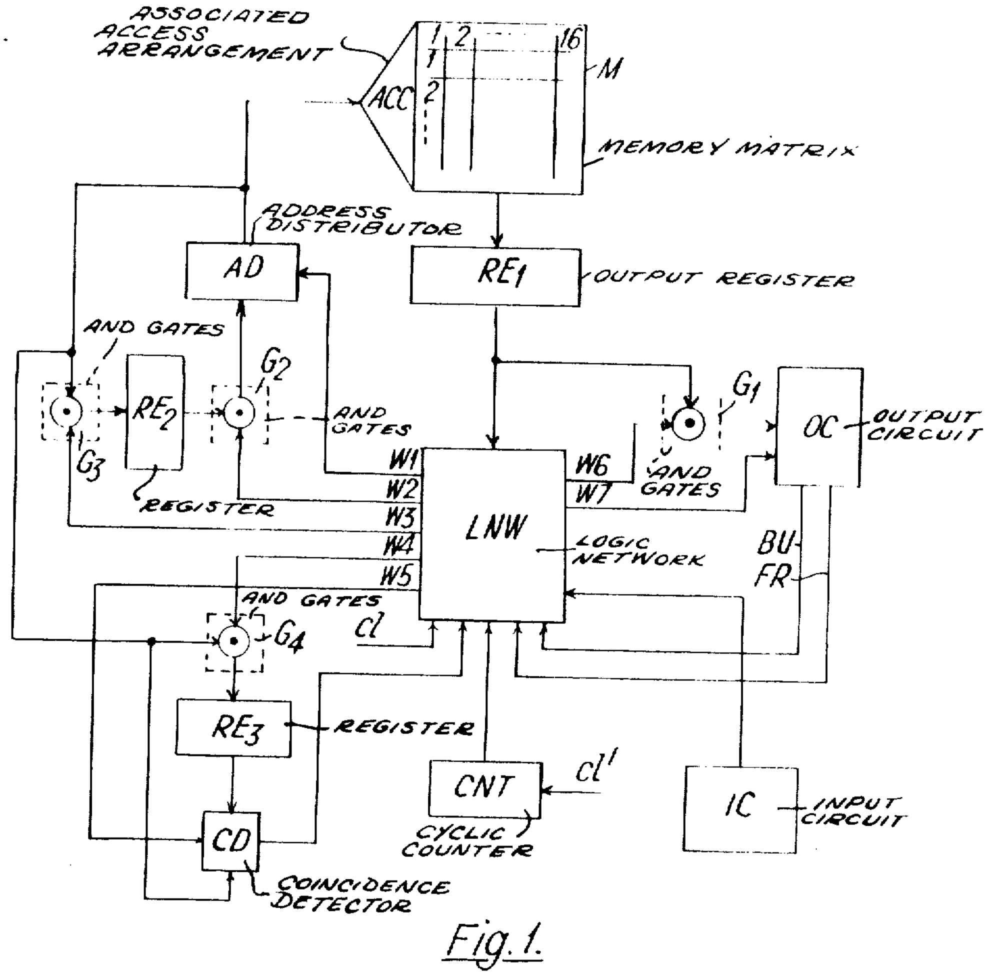

The present invention relates to an addressing arrangement in which a plurality of storage locations are linked one to the next.

Such an addressing arrangement is known in telephony particularly for the free PBX line hunting e.g. from the British Pat. No. 1,089,896 (H. Benmussa et al. 35–53–12) for Translator Arrangement issued in 1968 and assigned to the assignee of the present invention. Another reference, U.S. Pat. No. 3,204,039 issued Aug. 31, 1965 to H. H. Adelaar et al. for Selection System shows some of the basic features of the usage to which my invention pertains. In an arrangement including a memory, sometimes a plurality of possible distinct responses are associated to a same input information. These possible responses are generally stored at consecutive storage locations of the memory and one response out of the plurality of the possible ones is obtained by scanning the above consecutive locations and by verifying the output information each time obtained, whether it fulfils some predetermined requirements. The scanning operation is stopped as soon as a response satisfies the above predetermined requirements. For example, in the translator arrangement of an automatic telephone exchange a PBX line group comprising a plurality of lines grouped under the general directory number of the PBX group, is associated with a corresponding group of storage locations of the translator memory. The first storage location of the latter group stores the general directory number of the PBX group and the following storage locations thereof the equipment numbers of the different PBX lines, as well as other information relative thereto, e.g. class-of-service information etc. The translation of the above general directory number to one out of its associated equipment numbers is carried out by scanning the different storage locations. of the associated group of storage locations and by verifying each time an equipment number is obtained, whether the corresponding PBX line is free or busy. The translation is finished as soon as an equipment number corresponding to a free line is found.

The above known addressing arrangement performs the addressing of the different grouped storage locations assigned to a PBX line group in a predetermined order. It is evident that this scanning arrangement causes an unequal traffic distribution over the lines of a PBX group, since the traffic of such a PBX line depends on the rank its equipment number occupies in the associated group of storage locations in the translator memory.

Therefore, an object of the present invention is to provide an addressing arrangement of the above type, which does not present the mentioned drawback.

The present addressing arrangement is characterized by the fact, that a random number generator may be associated to one of said linked storage locations whereby upon the latter being addressed, the value of the number provided by said generator determines which of the remaining linked storage locations is next to be addressed by said addressing arrangement.

Figure 2:
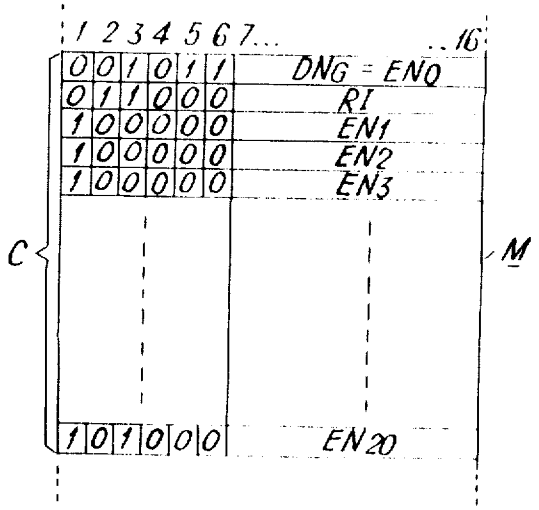

The above mentioned and other objects and features of the invention will become more apparent and the invention itself will be best understood by referring to the following description of embodiments taken in conjunction with the accompanying drawings in which:

FIG. 1 schematically shows an automatic telephone exchange translator including an addressing arrangement in accordance with the invention;

FIG. 2 is a diagrammatic representation of a PBX cell in the matrix memory of the translator of FIG. 1.

Referring to the figures and principally to FIG. 1, the translator shown therein is assumed to form part of the circuits of an automatic telephone exchange having a capacity of 1,000 lines. This translator is assigned to translate the directory numbers of the special lines of the exchange, i.e. of the lines having a special class-of-service and/or whose directory and equipment numbers cannot be derived from one another via a predetermined systematic relationship. The translator includes a ferrite core matrix memory M having an associated access arrangement ACC and a memory output register RE1. The matrix memory M comprises 16-bit rows, each such row containing a certain information like directory number, equipment number, class-of-service etc. and a code specifying the type of information. Each special line or group of PBX lines of the exchange is associated with a respective cell of the translator memory, this cell comprising a number of rows sufficient to store the different features of the associated line(s). The first row of a memory cell contains the directory number (binary form) of the associated line(s) with a six-bit code specifying whether this number pertains to a non-PBX line or to a PBX-line group. In the latter case the directory number is the general one of the PBX group. The following row(s) of the cell contain successively the equipment number(s) of the corresponding line(s) and the eventual class information which immediately follows the equipment number of the respective line.

FIG. 2 shows a typical example of how information is stored in a cell *c* of the memory M, which is assigned to a PBX group comprising 21 lines. For simplification purpose it is assumed that the lines of this PBX group have not a special class-of-service. The first row of cell *c* contains the general directory number $DN_G$ (bits seven to 16) of the considered PBX group with a six-bit code (bits one to six) specifying this kind of information. The above general directory number $DN_G$ is equal to the equipment number $EN_0$ of the first line of the PBX group, this equality being indicated by code bit three of the first row (bit three at "1"). The second row contains a random indicator word RI (bits seven to 16) with an appropriate code (bits one to six) assigned to specify this kind of information. The meaning of the random indicator word RI as well as the meaning of code bits five and six of the first row of cell *c* will be described later. The following 20 rows of memory cell *c* contain the respective equipment numbers EN1 to EN20 (bits seven to 16) of the lines of the considered PBX group with respective codes (bits one to six). The last equipment number EN20 of cell *c* is specially indicated by bit three (at "1") of its associated code. Reference may be had to U.S. Pat. No. 3,560,661 issued Feb. 2, 1971 and which was filed of even date herewith for more thorough disclosure of certain of the circuit elements shown herein.

Memory M (FIG. 1) is addressed by an address distributor AD constituted by a binary counter whose advance input is connected to the output *c*1 of a clock (not shown) via an output *w*1 and control circuits of a logic network LNW. The outputs of the address distributor AD are further connected to the corresponding inputs: of a register RE2 via a set of two-input AND-gates G3, of a register RE3 via a set of two-input AND-gates G4 and of a coincidence detector CD. The second inputs of AND-gates G3 and G4 are connected to an output *w*3 and an output *w*4 of the logic network LNW respectively. The outputs of register RE3 are connected to corresponding inputs of the coincidence detector CD, which further has an enabling input and an output respectively connected to an output *w*5 and to a corresponding input of logic network LNW. The outputs of register RE2 are connected to the corresponding inputs of the address distributor AD via a set of two-input AND-gates G2 which have their second inputs connected to an output *w*2 of logic network LNW. The outputs of memory register RE1 are connected, on the one hand to corresponding inputs of the logic network LNW and on the other hand to an output circuit OC via a set of two-input AND-gates G1. The second inputs of AND-gates G1 are connected to an output *w*6 of logic network LNW. Logic network LNW has further an output *w*7 which is connected to a corresponding input of the output circuit OC. The output circuit OC has two outputs referred to as BU and FR, which are connected to respective inputs of logic network LNW. The logic network LNW has also a number of inputs which are connected to corresponding outputs of a cyclic binary counter CNT and further another number of inputs which are connected to corresponding outputs of an input circuit IC. The cyclic counter CNT has its advance input connected to the output *c*1' of a clock (not shown) whose frequency is much lower than the frequency of the aforementioned clock. The principle of operation of the translator, as far as the non-PBX special lines are concerned, is conventional and similar to that described in the aforementioned British patent. Hence, only the translation of the general directory numbers of the PBX line groups, especially the operation of the addressing arrangement for the free PBX line hunting process, will hereinafter be described in detail by referring to FIGS. 1 and 2. The directory number requiring translation is received in decimal-binary form in the translator input circuit IC wherein it is converted in straight binary form. The converted directory number is next used to address a simplified translator (included in input circuit IC), which in response indicates whether the above directory number pertains to a normal or a special line. In the case the received directory number pertains to a normal line the translation is finished, since the code converted directory number constitutes the required equipment number. In the case the received directory number pertains to a special line, the input circuit IC enables logic network LNW to apply clock pulses to the advance input of address distributor AD via its output *w1*. The scanning of memory M is initiated and the successive memory row interrogation results appear in register RE1 by overwriting one another. Logic network LNW detects the codes associated with the different kinds of information appearing in register RE1 and performs the comparison of the directory numbers appearing therein (binary form) to the converted directory number registered in input circuit IC. For simplifying the description it is assumed that the received directory number in input circuit IC, is the general directory number $DN_G$ of the PBX group associated with cell *c* of memory M (FIG. 2). Upon this directory number $DN_G$ appearing in memory register RE1, logic network LNW detects its coincidence with the directory number in input circuit IC. It also detects that this directory number $DN_G$ pertains to a PBX group (bits five and six not zero bits) and that it is equal to the first equipment number $EN_0$ thereof. Following to these detections the output *w6* and *w7* of logic network LNW are activated. The activated output *w6* enables AND-gates G1 through which the equipment number $EN_0$ is transmitted from register RE1 to output circuit OC, whereas the activated output *w7* acknowledges to output circuit OC that the transmitted number $EN_0$ pertains to a PBX group. The output circuit OC tests the line associated with equipment number $EN_0$ whether it is free or busy and acknowledges the relative test result to logic network LNW by activating its output FR or BU respectively. If the above tested line is free the translation is finished. If the tested line is busy (output BU of circuit OC activated) the free PBX line hunting process is initiated.

For enabling a smooth traffic distribution over the different lines of the PBX group the free PBX line hunting process is started at a random address of the cell *c* in the way which will be explained hereinafter.

Generally, the above random address of a PBX cell of memory M is obtained by taking a certain number of bits, starting from the least significant bit, from the registered count of cyclic counter CNT and by adding the number they form to the address contained in address distributor AD. The number of bits to be taken from counter CNT is specified by code bits 5 and 6 of the first row of the PBX cell in accordance with the number of the lines comprised in the PBX group, in the following way: bits five and six: 01 one bit must be taken from counter CNT bits five and six: 10 two bits must be taken from counter CNT bits five and six: 11 three bits must be taken from counter CNT if no random indicator work RI is following; otherwise the number of bits indicated (in binary) by the random indicator word RI.

It is evident that the maximum number which may be formed by the number of bits taken from counter CNT has to be smaller than the number of lines of the involved PBX group. For example, the random indicator word RI following the general directory number $DN_G$ of the considered PBX group in cell *c* is assumed to indicate a number of four bits to be taken from counter CNT, this number of bits allowing a jump of at most 16 consecutive addresses for the address distributor AD. In this way, upon the random indicator word RI of cell *c* appearing in memory register RE1, the logic network LNW takes the four least significant bits from the content of counter CNT and enables a number of clock pulses equal to the number indicated in binary by the above four bits of counter CNT to be applied to the advance input of address distributor AD. During that time output *w6* of logic network LNW is inhibited. Output *w3* of logic network LNW is activated, after a small delay, by the first pulse of the above number of pulses and enables AND-gates G3. Via the thus enabled AND-gates G3 the address of equipment number EN1 is communicated from address distributor AD to register RE2. Output *w4* of logic network LNW is activated, after a small delay, by the last pulse of the above number of pulses and enables AND-gates G4. Via the latter gates the random address at which the PBX free line hunting process starts, e.g. the address of equipment number EN8, is communicated from address distributor AD to register RE3. When the above last pulse, e.g. the eighth pulse is transmitted to address distributor AD, the equipment number EN8 appears in register RE1. Output *w6* of logic network LNW is activated, so that this equipment number EN8 is transmitted to the output circuit OC via the thus enabled AND-gates G1. The line corresponding to this number EN8 is tested and if it is found busy output BU of circuit OC is activated. Following to this, logic network LNW enables the application of one clock pulse to the advance input of address distributor AD, so that the next equipment number EN9 appears in memory register RE1. The equipment number EN9 is transmitted to the output circuit OC in the same way as above and the PBX free line hunting process is continued until a free line is found. When all the lines corresponding to the equipment number EN8 to EN20 are found busy, output *w2* of logic network LNW is activated and enables AND-gates G2. Through the latter gates the address of equipment number EN1, which has been registered in register RE2 is communicated therefrom to address distributor AD wherein it replaces the previous address. The PBX free line hunting process is continued with the remaining nontested lines, but for these remaining lines output *w5* of logic network is activated, thus enabling coincidence detector CD to compare the content of register RE3, i.e. the address of equipment number EN8, to the content of address distributor AD, i.e. to the successive addresses appearing therein. When the address of equipment number EN8 appears in address distributor AD coincidence detector CD reacts and via its activated output disables logic network LNW, thus stopping the PBX free line hunting process.

Although the above detailed description has been made in relation to specific equipment, it will be clear that the equipment shown and described may be replaced by a conventional nonspecialized data processor suitably programmed in accordance with the invention and adapted to produce the required random numbers.

While the principles of the invention have been described above in connection with specific apparatus, it is to be clearly understood that this description is made only by way of example and not as a limitation on the scope of the invention.

We claim:

1. Addressing circuit arrangement in which a plurality of successive storage locations are grouped, and including a random number generator associatable with a first one of said grouped storage locations upon the latter being addressed, means associated with said first location for limiting the number received from said generator to a number less than the number of locations in the group, means for addressing said first location, means responsive to one condition at said first location means for revising the first storage location addressed by the value of the number provided by said generator to determine which other one of the remaining storage locations within the group is next to be addressed by said addressing arrangement.

2. Addressing arrangement as claimed in claim 1, said random number generator comprises a cyclic counter counting pulses applied thereto from a pulse source, and wherein there is means for storing at said first storage location an indication of the number of digits starting with the least significant digit which must be taken from the registered pulse count of said counter to form said number provided by said random number generator.

3. Addressing arrangement as claimed in claim 1, wherein there are provided means to address all said storage locations starting from said other one location, and said storage locations comprise a block of consecutive addresses.

4. Addressing arrangement as claimed in claim 3 wherein arrangement comprises part of a translator of an automatic telephone exchange having PBX lines with one of said lines at each of the addresses of a block to enable random hunting of PBX lines.

5. In a telephone system, wherein lines of a PBX group are grouped, a PBX line addressing and line hunting system comprising a location memory including a plurality of memory sections each representative of the identifying number of a line, group,) means stored with the plurality of sections representing lines of a PBX group numbered successively within the group memory for indicating the number of lines in the group, means responsive to an indication that an accessed number is a first one of a PBX group for testing the line represented by the first number, means responsive to a predetermined condition at said first number line enabling a random counter to randomly transmit a random number signal, means receptive of said random number for revising the accessed number by the value of said random number to produce another number within the group numbering; means for initiating testing of lines in the group by testing the line corresponding to said revised number and responsive to a busy indication for testing successive lines corresponding to successive representative numbers within said group until an idle number is found.

* * * * *